(12) United States Patent
Rosen et al.

(10) Patent No.: US 7,289,822 B2
(45) Date of Patent: Oct. 30, 2007

(54) METHOD FOR USING A SIGNALING CHANNEL TO SET UP A CALL REQUEST FOR A PUSH-TO-TALK COMMUNICATION ON A WIRELESS COMMUNICATION NETWORK

(75) Inventors: Eric C. Rosen, Solana Beach, CA (US); Harleen K. Gill, San Diego, CA (US); Arulmozhi Kasi Ananthanarayanan, San Diego, CA (US); Ashu Razdan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 11/156,033

(22) Filed: Jun. 16, 2005

(65) Prior Publication Data

US 2005/0288048 A1  Dec. 29, 2005

Related U.S. Application Data

(60) Provisional application No. 60/581,968, filed on Jun. 21, 2004, provisional application No. 60/686,147, filed on May 31, 2005.

(51) Int. Cl.
    *H04B 7/00* (2006.01)

(52) U.S. Cl. .................. 455/518; 455/517; 455/516
(58) Field of Classification Search ............. 455/518, 455/450, 509, 516, 517
See application file for complete search history.

(56) References Cited

U.S. PATENT DOCUMENTS

| | | | |
|---|---|---|---|
| 6,865,398 B2* | 3/2005 | Mangal et al. | 455/552.1 |
| 2002/0172165 A1 | 11/2002 | Rosen et al. | 370/310 |
| 2004/0042438 A1 | 3/2004 | Jiang et al. | 370/342 |
| 2004/0048764 A1 | 3/2004 | Diep et al. | 370/335 |
| 2004/0219940 A1* | 11/2004 | Kong et al. | 455/518 |
| 2005/0122937 A1* | 6/2005 | Hart et al. | 370/335 |

* cited by examiner

*Primary Examiner*—Edan Orgad
*Assistant Examiner*—Fayyaz Alam
(74) *Attorney, Agent, or Firm*—Robert J. O'Connell; Raphael Freiwirth

(57) ABSTRACT

An apparatus and method for enabling fast set up for push-to-talk (PT) communications in a wireless communication network. PTT set up related messages are identified through a specially designated header and the messages with the special designated header are transmitted through signaling channels from a radio transmission unit to a mobile device.

34 Claims, 7 Drawing Sheets

METHOD FOR USING A SIGNALING CHANNEL TO SET UP A CALL REQUEST FOR A PUSH-TO-TALK COMMUNICATION ON A WIRELESS COMMUNICATION NETWORK

CROSS-REFERENCE TO RELATED APPLICATIONS

This application claims the benefit of U.S. Provisional Patent Application Ser. No. 60/581,968, filed on Jun. 21, 2004; and U.S. Provisional Patent Application Ser. No. 60/686,147, filed on May 31, 2005. The contents of these documents are incorporated herein by reference.

BACKGROUND OF THE INVENTION

1. Field of the Invention

The invention relates to data transfer in a wireless telecommunication system and, more particularly, the identification of data type transferred within a wireless telecommunication system.

2. Description of the Related Art

In wireless telecommunication systems, Push-to-talk (PTT) capabilities are becoming popular with service sectors. PTT can support a "dispatch" voice service that operates over standard commercial wireless infrastructures, such as code division multiple access (CDMA), frequency division multiple access (FDMA), time division multiple access (TDMA), and global system for mobile communications (GSM). In a dispatch model, communication between endpoints (end user devices) occurs within virtual groups, wherein the voice of one "talker" is broadcast to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification. In the absence of a wireless multicast channel, each group is formed by the combination of separate point-to-point connections between each endpoint and PTT servers manage the call. Each endpoint is also known as a client.

FIG. 1 illustrates a prior art architecture 100 supporting PTT communications. The architecture includes the deployment of a single PTT server region in conjunction with a carrier's CDMA infrastructure and packet data network. Each region of the PTT servers is deployed over a specific portion of a carrier packet data network. The PTT server within the region may be routing traffic between one or more Packet Data Service Nodes (PDSNs) in the carrier network. A communication device 102 that supports the PTT feature is in communication with a base station 104. The base station 104 is in communication with a high speed network 106 and PTT communications received from the communication device 102 is sent through the base station 104 and the network 106 to a packet data service node (PDSN). The PDSN communicates with the high speed network 106 and a PTT server's network 108, which is connected to a PTT network 110. The PDSN forwards the PTT communications to a PTT server 112 in the PTT network 110.

The PTT server 112 handles PTT communications among members of a PTT group. The PTT server 112 receives a PTT communication from one member and forwards it to all members of the PTT group. The PTT communication is usually received as data packets from the network 110, and the PTT communication sent out by the PTT server 112 are also in data packet format. A receiving mobile switching center (MSC) and a connected base station (BS) then established a dedicated channel to transmit the PTT communication to a receiving mobile client (a PTT member).

FIG. 2 illustrates a prior art message flow 200 for a PTT call set up. When a PTT user (originator) is ready to make a PTT communication, he presses a PTT activation button on his mobile device 102 and a PTT request is thus made. In response to the PTT request received by the mobile device 102, and the mobile device sends a call request to the PTT server 112, which is also known as the PTT dispatcher. The PTT server 112 receives the call request and process the call request. The call request processing includes identifying the PTT user, identifying a PTT group to which the PTT user belongs, identifying member of this PTT group, and preparing announce call messages to be sent to each member of the PTT group.

After the PTT server 112 sends the announce call messages, each announce call message is received by a MSC and forwarded by the MSC to a BS. The BS broadcasts the announce call message. If a mobile client who is a targeted receiver is available, the mobile client sends an accept call message back to the PTT server 112. After receiving the accept call message from at least one mobile client, the PTT server 112 sends a floor grant message back to the originating mobile client. There may be more than one targeted user in the originator's PTT communication group, and the PTT server 112 will grant the floor to the originator if there is at least one targeted mobile client available. After receiving the floor grant message, the PTT requesting mobile client (originator) can then make a PTT communication.

The PTT communication set up process described above is time sensitive and the initial PTT latency shown in FIG. 2 is affected by network traffic. The long latency affects directly users of the PTT communication. Therefore, it is desirous to have a system and method for enabling fast PTT set up, and it is to such system and method this invention is primarily directed.

SUMMARY OF THE INVENTION

The apparatus and method of the invention enables fast response to PTT related inputs from a PTT communication user. In one embodiment, there is provided a method for enabling fast set up of a push-to-talk communication between a mobile device and a wireless communication network, wherein the mobile device communicates with the wireless communication network through signaling channels and data channels. The method includes receiving at radio signal transmission point a data packet containing a PTT message from a data communication network, checking the data packet, and, if the PTT message in the data packet is a set up related message, transmitting the PTT message to the mobile device through a signaling channel.

In another embodiment, there is provided a method for enabling fast set up of a push-to-talk communication between a mobile device and a wireless communication network, wherein the mobile device communicates with the wireless communication network through signaling channels and data channels. The method includes receiving at the mobile device a PTT communication request, and transmitting a PTT message through a signaling channel to a radio transmission point, the radio transmission point being in communication with a PTT server.

In yet another embodiment, there is provided an apparatus for enabling fast set up of a push-to-talk (PTT) communication between a mobile device and a wireless communication network, wherein the apparatus is in communication with the mobile device through signaling channels and data channels. The apparatus includes a network interface unit for receiving a PTT message from a data network, a storage unit for storing the PTT message, a controller unit for analyzing the PTT message, and a radio interface unit for transmitting the PTT message via radio signal to a mobile device. If the PTT message in the storage unit is a set up related message, the radio interface unit transmits the PTT message to the mobile device through a signaling channel.

In yet another embodiment, there is provided an apparatus for enabling fast set up of a push-to-talk (PTT) communication between a mobile device and a wireless communication network, wherein the apparatus is in communication with the mobile device through signaling channels and data channels. The apparatus includes a user interface for receiving a PTT message with a user, a storage unit for storing the PTT message received from the user, a controller unit for analyzing the PTT message stored in the storage unit, and a transceiver unit for transmitting the PTT message through a signaling channel to the wireless communication network.

The present apparatus and methods are therefore advantageous as they enable a wireless communication device to give priority to PTT call set up related messages. Through using the signaling channel for transferring PTT call set up related messages, the latency of a PTT call can be reduced.

Other advantages and features of the present invention will become apparent after review of the hereinafter set forth Brief Description of the Drawings, Detailed Description of the Invention, and the claims.

DETAIL DESCRIPTION OF THE INVENTION

In this description, the terms "communication device," "wireless device," "wireless communications device," "PTT communication device," "handheld device," "mobile device, and "handset" are used interchangeably. The term "application" as used herein is intended to encompass executable and nonexecutable software files, raw data, aggregated data, patches, and other code segments. The term "exemplary" means that the disclosed element or embodiment is only an example, and does not indicate any preference of user. Further, like numerals refer to like elements throughout the several views, and the articles "a" and "the" includes plural references, unless otherwise specified in the description.

In overview, the system and method enables fast set up for a push-to-talk (PTT) communication between a wireless device and a wireless communication network. Normally, when a wireless device is ready to transmit a PTT communication to a base station (BS), the wireless device sends a channel request to the BS through a signaling channel to effect the establishment of a dedicated channel. The BS will establish a reverse access channel and the wireless device will then transmit the PTT communication over the reverse access channel to the BS. Similarly, when the BS is ready to transmit a PTT communication to the wireless device, the BS broadcasts a paging message through the signaling channel to the wireless device. After the wireless device acknowledges the paging message, the BS establishes a forward access channel to the wireless device and transmits the PTT communication through the forward access channel to the wireless device. The set up process for the PTT communication can sped up by transmitting set up related PTT messages through the signaling channel, instead of waiting for connecting to a dedicated access channel.

Figure 1:
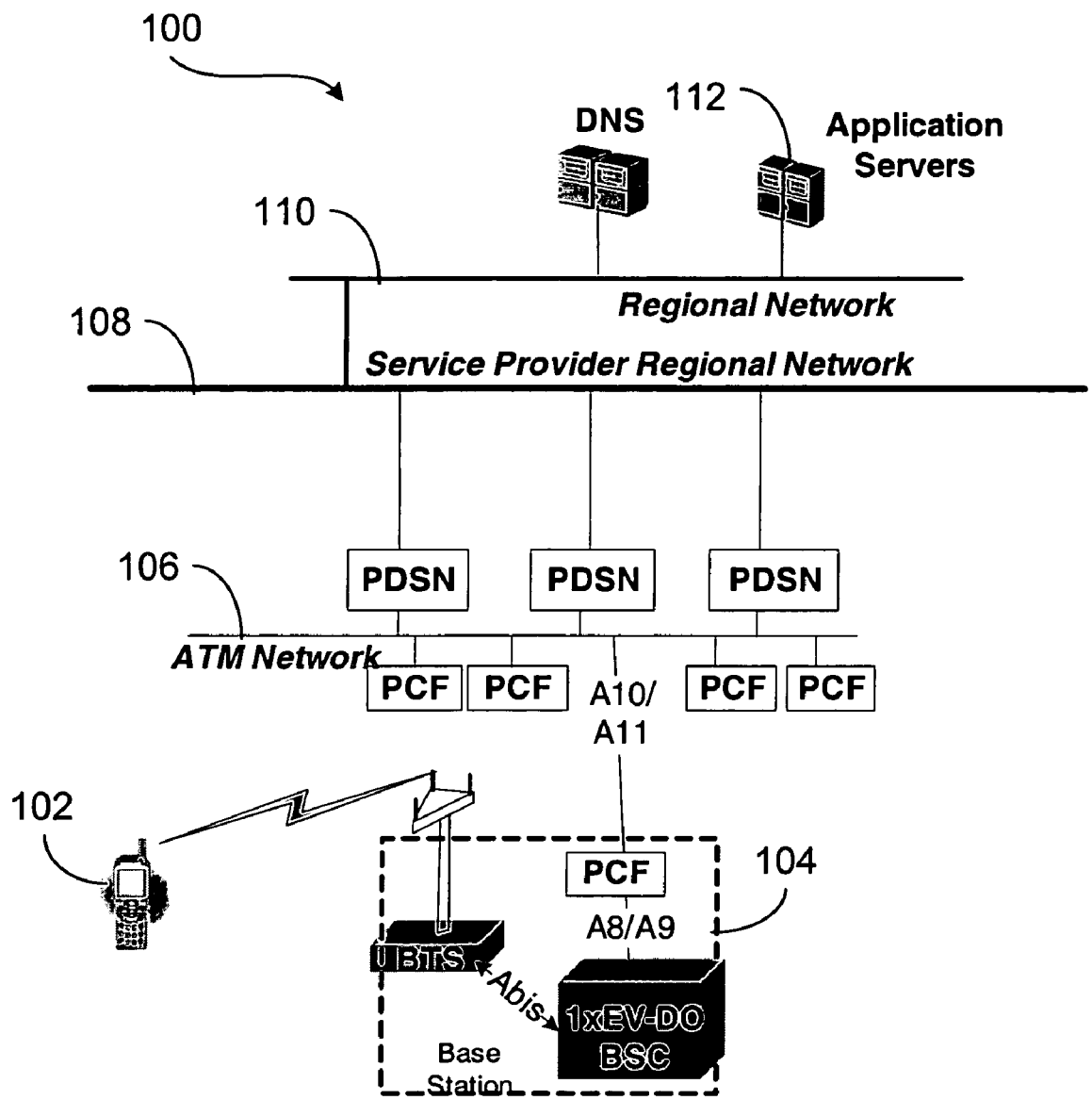
FIG. 1 is a prior art architecture of a wireless communication network.
Figure 2:
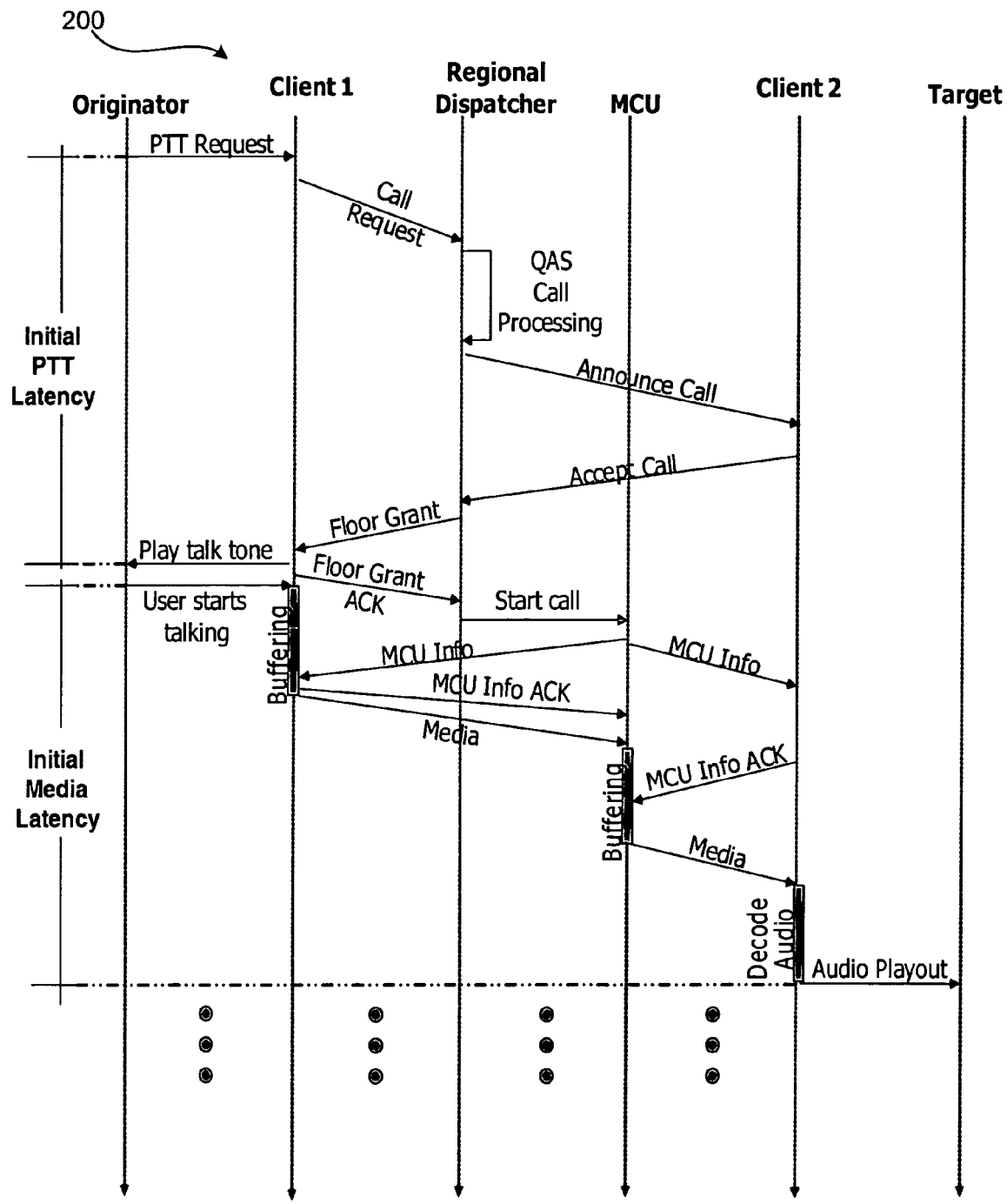
FIG. 2 is a prior art message flow for setting up a PTT call.
Figure 3:
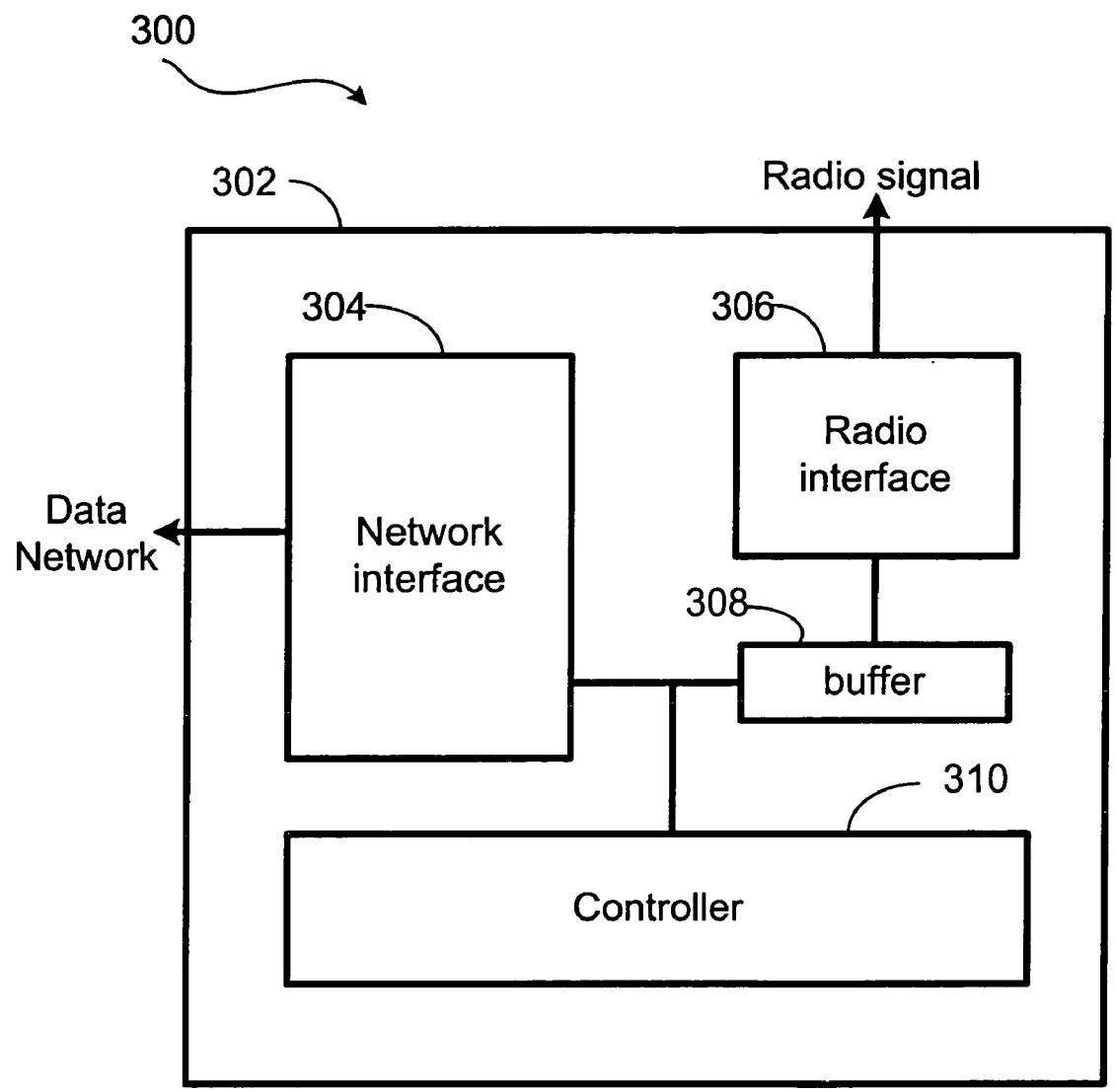
FIG. 3 is an architecture of a base station according to one embodiment of the invention.

FIG. 3 is a simplified architecture 300 of a BS server capable of transmitting PTT set up related messages through signaling channels. The BS server 302 includes a network interface unit 304 for receiving data packets from a data network, a buffer 308 for storing PTT messages, a radio interface unit 306 for transmitting PTT messages in format of radio signals to wireless devices, and a controller unit 310. A data packet received from the data network may include PTT messages, in particular, PTT set up messages. When a PTT message is received, it is stored in a buffer 308. The controller unit 310 analyzes the PTT message in the buffer 308. If the PTT message is a set up related PTT message, such as a call announce message or floor grant message, the controller will instruct the radio interface unit 306 to embed the PTT message in a signaling message and transmit it over a signaling channel to the wireless device. The set up related PTT messages are identified by their packet headers.

Figure 4:
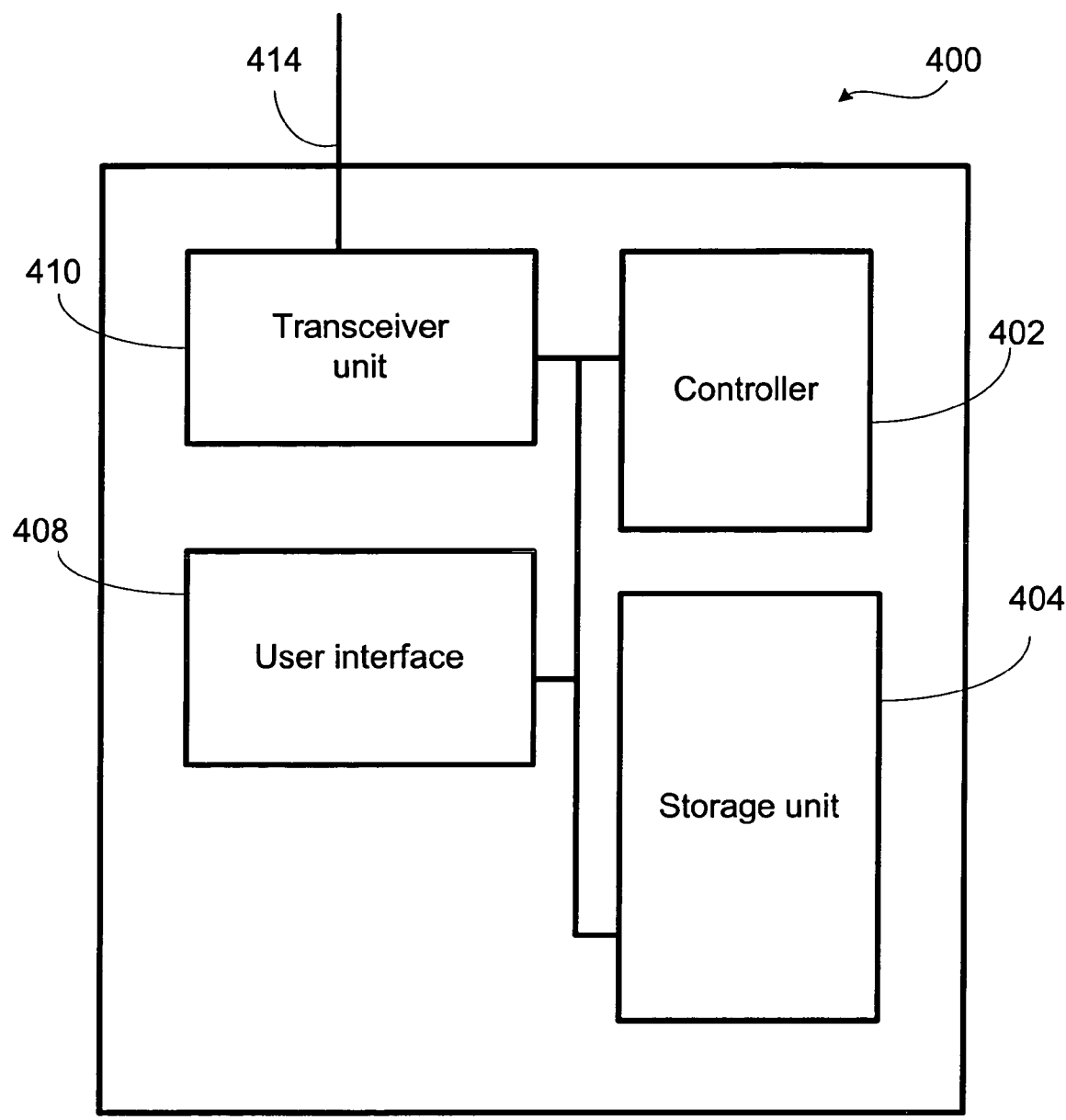
FIG. 4 is an architecture of an exemplary embodiment of a wireless device.

FIG. 4 is a simplified architecture 400 of a wireless device. The wireless device includes a user interface unit 408 for communicating with a user, a storage unit 404 for storing information, a transceiver unit 410 for receiving and transmitting information to a wireless communication network, and a controller 402. The user interface unit includes (not shown) a display unit, a speaker unit, a microphone, and a PTT activation button. When the user is ready to make a PTT communication, the user presses the PTT activation button and the controller 402 then generates a PTT call request. The PTT call request is embedded in a signaling message and transmitted through a signaling channel by the transceiver unit to a BS in the wireless communication network.

The wireless device may also transmit a PTT set up request message to the BS independent of any action from the user. When the wireless device is powered up, the wireless device may receive a PTT call announce message from the BS. In response to the PTT call announce message, the controller unit 402 generates a PTT accept call message, and the transceiver unit 410 embeds the PTT accept call message in a signaling message and sends it through the signaling channel back to the BS.

Figure 5:
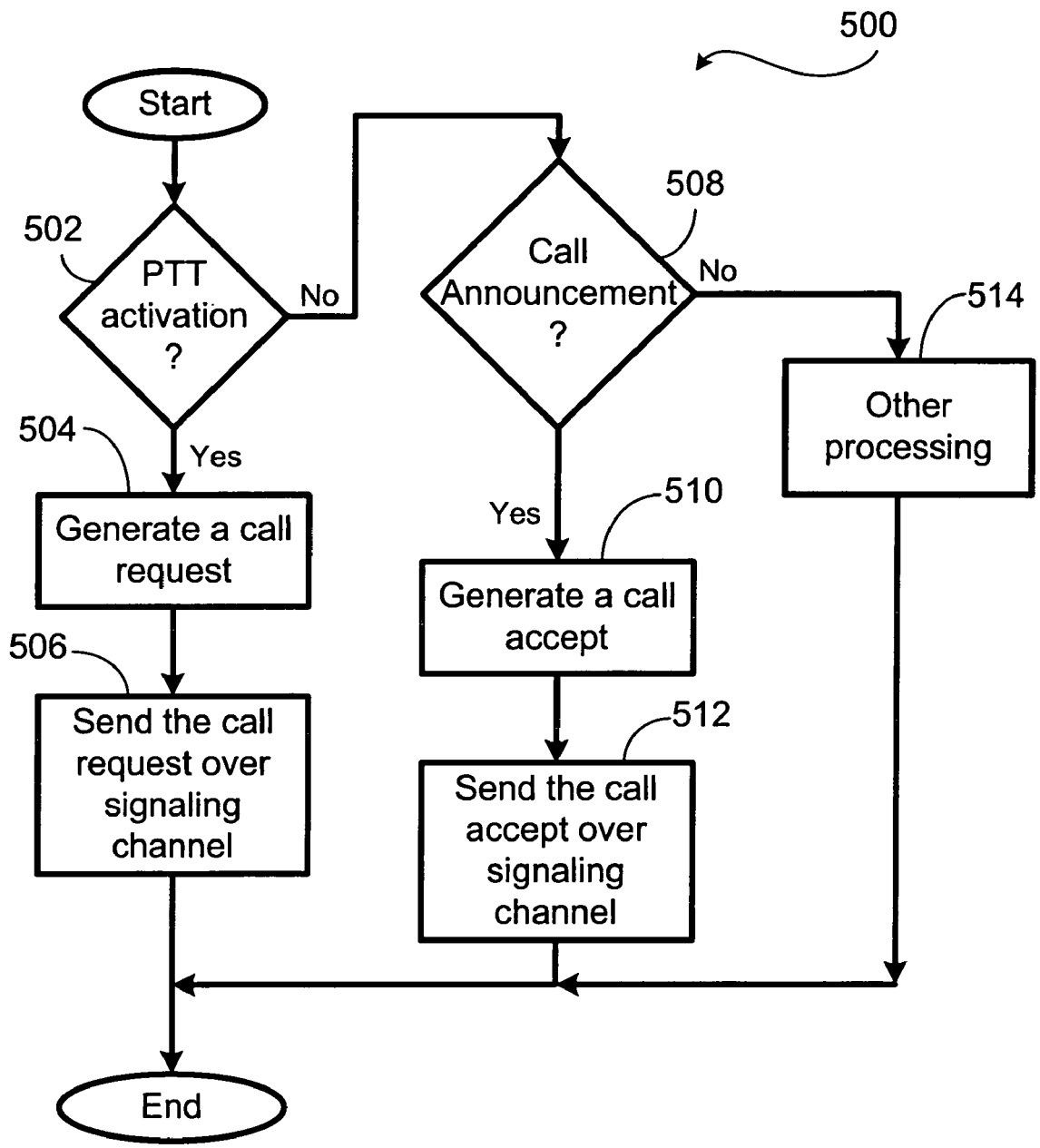
FIG. 5 is a flow chart of an exemplary embodiment a wireless device process.

FIG. 5 is a flow chart 500 for one embodiment of a PTT process at a wireless device. The wireless device continuously monitors requests from either a user or a PTT server through the wireless communication network. When a PTT related input is received by the wireless device, the PTT process checks whether it is a PTT activation request, step 502. A PTT activation request is received by the PTT process on the wireless device in response to the user's activation of the PTT feature on the wireless device. If the PTT input is a PTT activation request, the wireless device generates a call request, step 504, and send the call request to a PTT server over the wireless communication network, step 506. The call request is a PTT call set up related message and it is transmitted in a signaling message over a signaling channel to a base station, i.e., the call request message is embedded in the signaling message. The wireless device transmits time sensitive PTT call set up related messages, such as a call request or call accept messages, through the signaling channel to the base station, instead of requesting a dedicated reverse channel.

If the PTT input is a call announcement, step 508, from the base station, the wireless device generates a call accept message, step 510, and transmits the call accept message back to the base station through the signaling channel, step 512. By transmitting the call accept message through the signaling channel back to the base station, which forwards it to the PTT server, instead of sending it through a dedicated reverse channel, the PTT server can grant the floor faster to a PTT call originating wireless device. The PTT process will also process other PTT related inputs, step 514.

Figure 6:
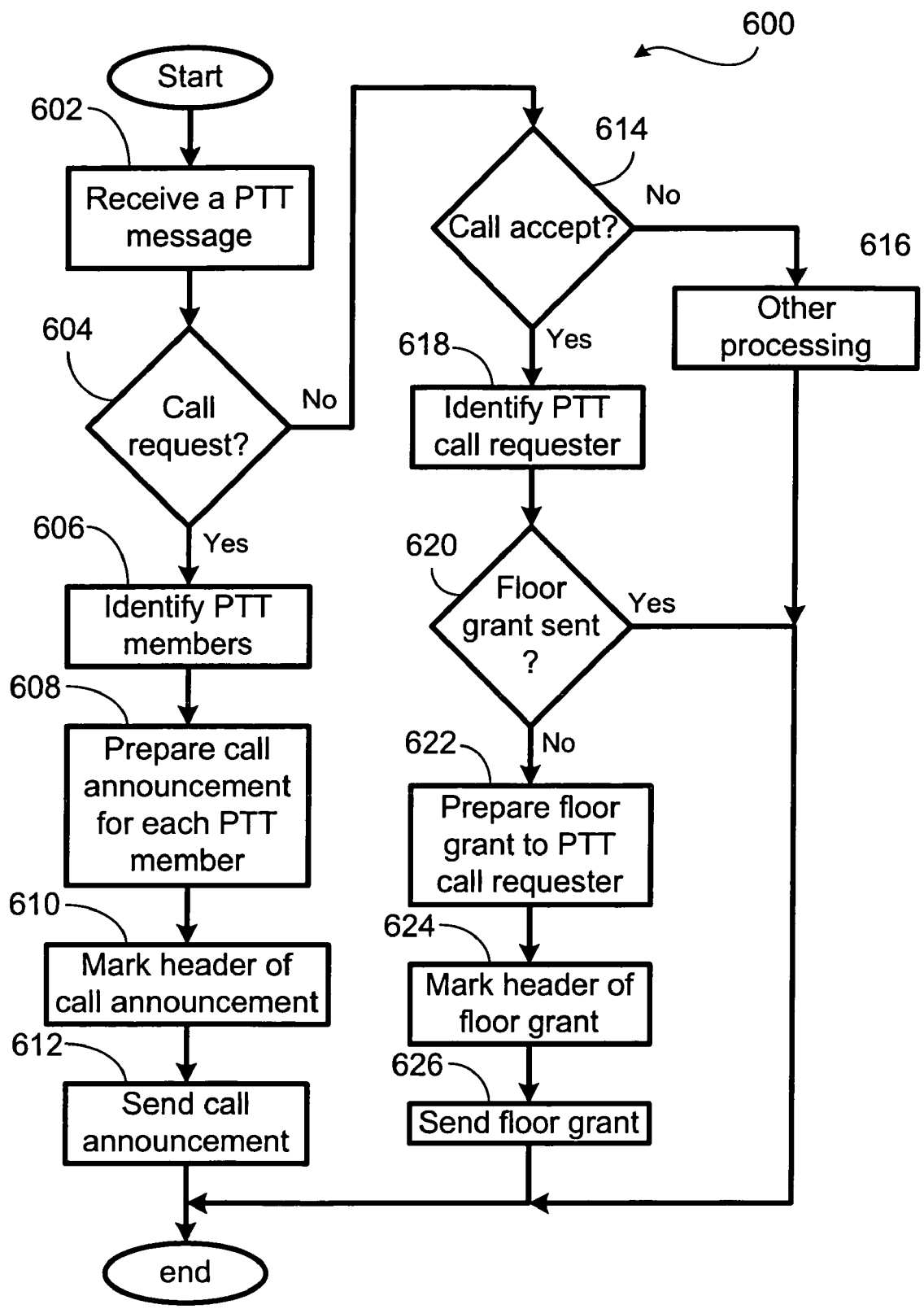
FIG. 6 is a flow chart an exemplary embodiment of a PTT server process.

FIG. 6 is a flow chart 600 for a PTT server. The PTT server receives PTT related messages from all PTT subscribers. When the PTT server receives a PTT message from a user, step 602, it checks if it is a PTT call request, step 604. If the PTT message is a call request, the PTT server identifies PTT members of the PTT group to which the user belongs, step 606. After identifying the PTT members, the PTT server generates a call announcement message for each PTT member, step 608. The PTT server specially marks the header of the PTT call announce message, step 610, so the PTT call announce message will be handled differently by a base station. After the PTT call announce message is generated with a special header, the PTT server sends it to a base station, step 612, and the base station will then send the PTT call announce message to the PTT members.

If the received PTT message is not a PTT call set up message, the PTT server checks whether the PTT message is a call accept message from a wireless device, step 614. If the PTT message is a call accept message, the PTT server identifies the user who requested the PTT call, step 618, and checks whether a floor grant message has been sent to the requesting user, step 620. The user may use the PTT feature to communicate with more than one PTT member, and consequently more than one call accept message may be received by the PTT server. If the PTT server has not sent any floor grant message to the requesting user, i.e., the received call accept message is the first call accept message, the PTT server generates a floor grant message, step 622, and marks the header of the floor grant message specially, step 624, to denote it as a call set up related message. The specially marked floor grant message is sent as a data packet to a base station, step 626, which in turn will transmit to the requesting wireless device. If a floor grant message has already been sent to the requesting wireless device, then the PTT server will not send another floor grant message to the same requesting wireless device. The PTT server will also handle other PTT related messages, step 616.

Figure 7:
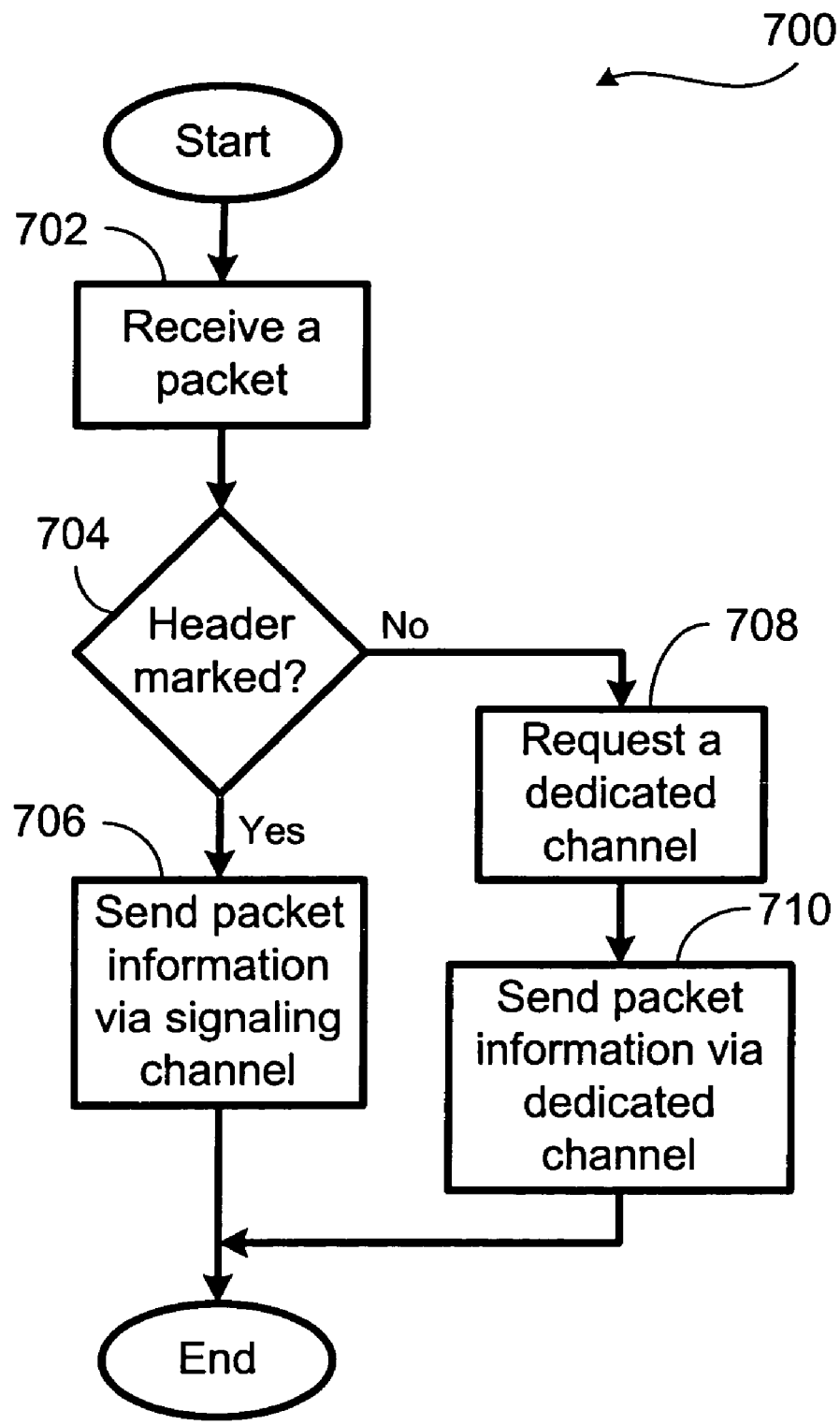
FIG. 7 is a flow chart of an exemplary embodiment of a base station process for processing PTT related messages.

The data packets with special headers are handled differently by a base station. FIG. 7 illustrates a process 700 for a base station handling incoming data packets. When the base station receives a data packet, step 702, it checks the data packet's header, step 704. If the packet header is marked for it to be sent through a signaling channel to a targeted wireless device, the base station transmits the data packet's information through the signaling channel, step 706. If the packet's header is not specially marked, then the base station will establish a dedicated channel, step 708, and sends the data packet via the dedicated channel to the targeted wireless device, step 710.

The following is a use scenario illustrating the invention. When a user desires to communicate via the PTT feature with members of a PTT group that includes his co-workers at a construction site, the user pushes the PTT button on his wireless device. The wireless device detects the activation of the PTT button, generates a call request message, and sends the call request message to a PTT server. The call request message is a call set up message and the wireless device will transmit it as a signaling message through a signaling channel to a base station. By transmitting the call request message through the signaling channel, the call request message can be received sooner by the PTT server. The base station receives the signaling message and forwards it to the PTT server.

The PTT server receives the call request message, identifies the requesting user and the PTT group to which he belongs. The PTT server also identifies the members of this PTT group and generates a PTT call announce message to each member. The PTT call announce message is sent to a base station as a data packet with a header that is specially marked. The base station receives this PTT call announce message and sees it is a special data packet. The base station then, instead of establishing a dedicated channel to a targeted wireless device of a PTT member, embeds the PTT call announce message in a signaling message and transmits it via a signaling channel to the targeted wireless device.

If the targeted wireless device is available, it will respond to the PTT call announce message with a call accept message. The targeted wireless device transmits the call accept message via a signaling channel back to the base station. The base station forwards the call accept message in a data packet to the PTT server. After receiving the first call accept message, the PTT server grants the floor to the requesting wireless device and sends a floor grant message to the requesting wireless device. The floor grant message is sent as a data packet with a special header and destined to the requesting wireless device.

The floor grant message is received by the base station serving the requesting wireless device, and the base station checks the data packet's header. Upon realizing it is a special marked data packet, the base station embeds the floor grant message in a signaling message and transmits the message via a signaling channel to the requesting wireless device. When the requesting wireless device receives the floor grant message, it notifies the user that it is ready to receive any message the user wants to send to other PTT members.

By transmitting call request, call accept, and other call set up related messages through a signaling channel instead of requesting and waiting for a dedicated channel be set up, a PTT system can enable a fast response to PTT related requests from a user and thus making use of the PTT feature more pleasant to the user.

In view of the method being executable on a wireless service provider's computer device or a wireless communications device, the method can be performed by a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In the context of FIGS. 5-7, the method may be implemented, for example, by operating portion(s) of the wireless network, such as a wireless communications device or the server, to execute a sequence of machine-readable instructions. Though the steps are illustrated in sequence, the method may be implemented in difference sequence or as an event driven process. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail may be made without departing from the spirit and scope of the present invention as set forth in the following claims. For example, the description above is based on an audio PTT communication, it is understood the apparatus, system, and method can be easily modified to support other type of media, such as video, data, etc. Furthermore, although elements of the invention may be described or claimed in the singular, the plural is contemplated unless limitation to the singular is explicitly stated.

What is claimed is:

1. A method for enabling fast set up of a push-to-talk (PTT) communication between a mobile device and a wireless communication network, the mobile device communicating with a Base Station (BS) of the wireless communication network through, at least, a signaling channel and a traffic channel, comprising:
   receiving at the BS a data packet containing a PTT message from a data communication network, the data communication network being in communication with a PTT server;
   checking a data packet header of the data packet; and
   if the data packet header is specially marked to indicate a set-up related PTT message, transmitting the data packet to the mobile device through the signaling channel.

2. The method of claim 1, further comprising if the set-up related PTT message in the data packet does not have the specially marked data packet header, transmitting the set-up related PTT message to the mobile device through a dedicated traffic channel.

3. The method of claim 1, wherein the PTT message is a PTT call announce message.

4. The method of claim 1, wherein the PTT message is a PTT floor grant message.

5. The method of claim 1, further comprising embedding the PTT message in a signaling message.

6. A method for enabling fast set up of a push-to-talk (PTT) communication between a mobile device and a wireless communication network, the mobile device communicating with a Base Station (BS) of the wireless communication network through, at least, a signaling channel and a traffic channel, comprising:
   receiving at the mobile device a set-up related PTT communication request;
   marking a data packet header of a data packet containing a set-up related PTT message; and
   transmitting the specially marked data packet header of a data packet of the PTT message through the signaling channel to the BS, the BS being in communication with a PTT server.

7. The method of claim 6, wherein the PTT communication request is a PTT activation request from a user.

8. The method of claim 6, wherein the PTT message is a PTT call request message.

9. The method of claim 6, wherein the PTT communication request is a PTT announce call message from the radio transmission point.

10. The method of claim 6, wherein the PTT message is a PTT accept call message.

11. An apparatus for enabling fast set up of a push-to-talk (PTT) communication between a mobile device and a wireless communication network, the apparatus in communication with the mobile device through, at least, a signaling channel and a traffic channel, comprising:
    a network interface unit for receiving at a Base Station (BS) a data packet containing a PTT message from a data network, the data communication network being in communication with a PTT server;
    a storage unit for storing the PTT message;
    a controller unit for analyzing a data packet header of the data packet to determine if the PTT message is a set-up related PTT message; and
    a transmission unit for transmitting the PTT message to the mobile device,
    wherein, if the PTT message in the storage unit is a set up related message, the PTT message is transmitted to the mobile device through the signaling channel.

12. The apparatus of claim 11, wherein, if the PTT message in the storage unit is not a set up related message, transmitting the PTT message to the mobile device through a dedicated traffic channel.

13. The apparatus of claim 11, wherein the PTT message is a PTT call announce message.

14. The apparatus of claim 11, wherein the PTT message is a PTT floor grant message.

15. The apparatus of claim 11, wherein the PTT message is embedded in a signaling message.

16. An apparatus for enabling fast set up of a push-to-talk (PTT) communication, the apparatus communicating with a Base Station (BS) of a wireless communication network through, at least, a signaling channel and a traffic channel, comprising:
    a receiver for receiving a data packet containing a PTT communication message;
    a storage unit for storing the received PTT communication message;
    a controller unit for marking a data packet header of the data packet containing a set-up related PTT communication message stored in the storage unit; and
    a transceiver unit for transmitting the specially marked data packet header of a data packet of the PTT communication message through the signaling channel to the BS of the wireless communication network.

17. The apparatus of claim 16, wherein the PTT message is a PTT activation request from a user.

18. An apparatus for enabling fast set up of a push-to-talk (PTT) communication between a mobile device and a wireless communication network, the apparatus in communication with the mobile device through, at least, a signaling channel and a traffic channel, comprising:

means for receiving at a Base Station (BS) a data packet containing a PTT message from a data network, the data communication network being in communication with a PTT server;

means for storing the PTT message;

means for analyzing a data packet header of the data packet to determine if the PTT message is a set-up related PTT message; and means for transmitting the PTT message to the mobile device, wherein, if the PTT message in the storage unit is a set up related message, the PTT message is transmitted to the mobile device through the signaling channel.

19. The apparatus of claim 18, wherein, if the PTT message in the storage unit is not a set up related message, the PTT message is transmitted to the mobile device through a dedicated traffic channel.

20. The apparatus of claim 18, wherein the PTT message is a PTT call announce message.

21. The apparatus of claim 18, wherein the PTT message is a PTT floor grant message.

22. The apparatus of claim 18, wherein the PTT message is embedded in a signaling message.

23. An apparatus for enabling fast set up of a push-to-talk (PTT) communication, the apparatus communicating with a Base Station (BS) of a wireless communication network through, at least, a signaling channel and a traffic channel, comprising:

means for receiving a data packet containing a PTT communication message;

means for storing the received PTT communication message;

means for marking a data packet header of the data packet containing a set-up related PTT communication message stored in the storage unit; and means for transmitting the specially marked data packet header of a data packet of the PTT communication message through the signaling channel to the BS of the wireless communication network.

24. The apparatus of claim 23, wherein the PTT message is a PTT activation request from a user.

25. A computer-readable medium embodying a set of instructions, wherein the set of instructions when executed by one or more processors comprises:

a set of instructions for receiving at the BS a data packet containing a PTT message from a data communication network, the data communication network being in communication with a PTT server;

a set of instructions for checking a data packet header of the data packet; and if the data packet header is specially marked to indicate a set-up related PTT message, a set of instructions for transmitting the PTT message to the mobile device through the signaling channel.

26. The computer-readable medium of claim 25, further comprising if the PTT message in the data packet is not a set up related message, transmitting the PTT message to the mobile device through a dedicated traffic channel.

27. The computer-readable medium of claim 25, wherein the PTT message is a PTT call announce message.

28. The computer-readable medium of claim 25, wherein the PTT message is a PTT floor grant message.

29. The computer-readable medium of claim 25, further comprising embedding the PTT message in a signaling message.

30. A computer-readable medium embodying a set of instructions, wherein the set of instructions when executed by one or more processors comprises:

a set of instructions for receiving at the mobile device a set-up related PTT communication request;

a set of instructions for marking a data packet header of a data packet containing a set-up related PTT message; and a set of instructions for transmitting the specially marked data packet header of a data packet of the a PTT message through a signaling channel to the BS, the BS being in communication with a PTT server.

31. The computer-readable medium of claim 30, wherein the PTT communication request is a PTT activation request from a user.

32. The computer-readable medium of claim 30, wherein the PTT message is a PTT call request message.

33. The computer-readable medium of claim 30, wherein the PTT communication request is a PTT announce call message from the radio transmission point.

34. The computer-readable medium of claim 30, wherein the PTT message is a PTT accept call message.

* * * * *